United States Patent [19]  [11] 4,303,821
Preston  [45] Dec. 1, 1981

[54] STRIP WELDING FOR BUTT JOINTS
[75] Inventor: Robert M. Preston, Tulsa, Okla.
[73] Assignee: David J. Eastin, a part interest
[21] Appl. No.: 95,551
[22] Filed: Nov. 19, 1979
[51] Int. Cl.³ .......................... B23K 9/18; B23K 9/28
[52] U.S. Cl. ................................ 219/73; 219/137.44; 219/137.8
[58] Field of Search ..................... 219/73, 73.1, 73.11, 219/73.2, 76.1, 76.14, 137.2, 137.31, 137.44, 137.61, 137.8; 228/41

[56] References Cited
U.S. PATENT DOCUMENTS

| 2,848,593 | 8/1958 | Newman et al. ................ 219/73 R |
| 3,670,139 | 6/1972 | Pandjiris et al. ................. 219/73.2 |
| 3,751,628 | 8/1973 | Scherl ........................... 219/73 R X |
| 3,832,523 | 8/1974 | Kitani et al. .................... 219/73 R X |

FOREIGN PATENT DOCUMENTS 54-32747 10/1979 Japan .
54-32750 10/1979 Japan .
354952 12/1972 U.S.S.R. .......................... 219/76.14
490594 3/1976 U.S.S.R. .......................... 219/76.14

Primary Examiner—Gene Z. Rubinson
Assistant Examiner—Keith E. George
Attorney, Agent, or Firm—Head & Johnson

[57] ABSTRACT

A welding apparatus in combination with a submerged arc welding head and a plurality of welding ribbons having an adapter plate attached to the welding head and a vertical brace attached to the adapter plate. A plurality of jaw assemblies are pivotally connected to the vertical brace. The welding ribbons pass through a ribbon guide mounted to the adapter plate and pass through the jaw assemblies. By rotating a plurality of cams, which are in contact with the jaw assemblies, the relative angle between the jaw assemblies and ribbons may be adjusted. By rotating a pivot rod the distance between the jaw assemblies and ribbons may be adjusted.

7 Claims, 13 Drawing Figures

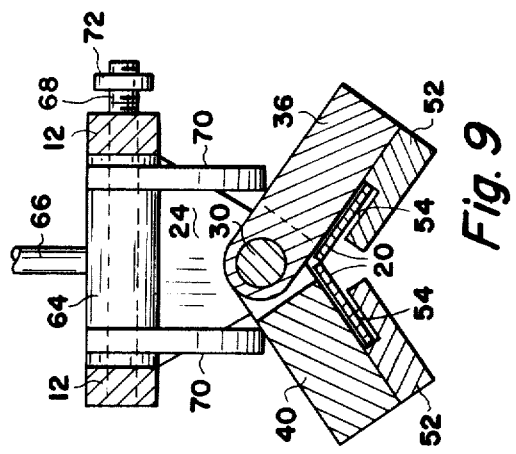
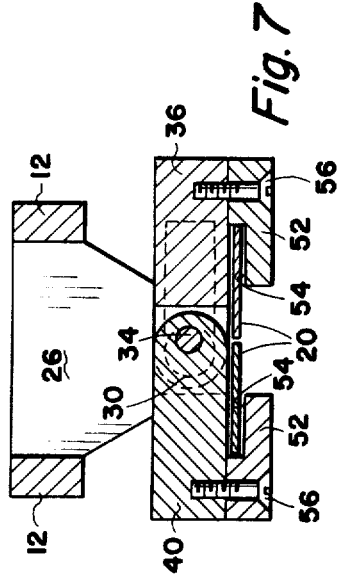
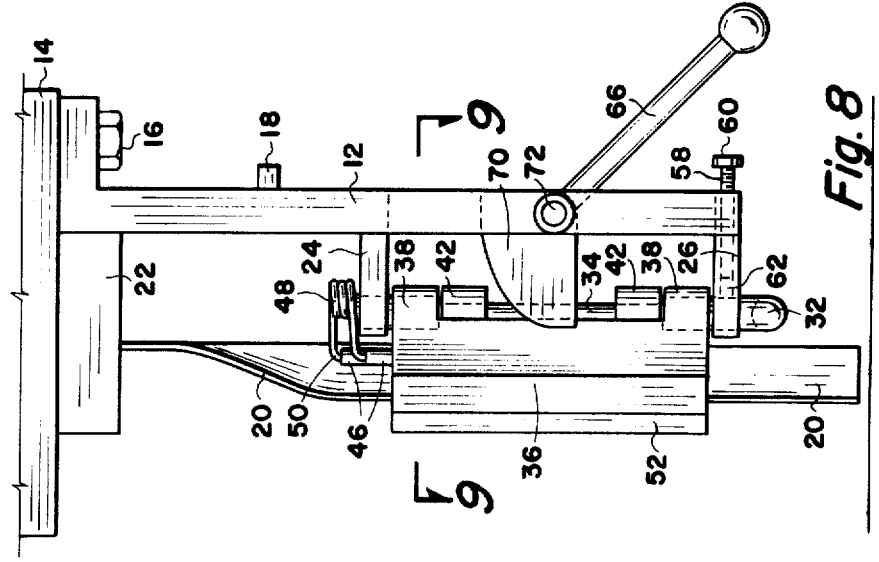

STRIP WELDING FOR BUTT JOINTS

BACKGROUND OF THE INVENTION

1. Field of the Invention

The present invention relates to a welding apparatus or fixture for use with a submerged arc welding head and welding ribbons and, more particularly, to such an apparatus whereby the relative angle and distance between the ribbons may be adjusted.

2. Description of the Prior Art

Various types of welding devices have been designed to use welding bands or ribbons instead of circular welding rods. Welding bands or ribbons are most often used as filler metal for cladding and for providing a special type of lining or coating within a pipe or conduit but, to iventor's knowledge, has not been successfully used for joint or strength welding two pieces of material together. Welding rod or wire has been used to lay consecutive layers of material within the typical V-joint of the material until the V-joint has been filled and a cap weld is applied. The use of welding rod or wire to fill butt joints is time consuming and energy inefficient. There does not appear to be a welding apparatus which may quickly and efficiently weld a butt joint using welding bands or ribbons which are adjustable as the welding progresses from, and including, the root of the groove to the cap weld over the filled joint.

SUMMARY OF THE INVENTION

The present invention generally provides a welding apparatus for use with a submerged arc welding head and a supply of welding ribbons whereby the relative angle between the ribbons may be adjusted from a deep V-shape to a flat or open position. This invention allows welding ribbons to be used to weld a butt joint quickly and efficiently. Also, the present invention may be adjusted to an open or flat position in order to lay a cap weld over a butt joint. The apparatus may be used to deposite filler metal or cladding and surfacing of pipes, conduits or flat materials.

The welding apparatus is attached to an adapter plate which, in turn, is attached to the submerged arc welding head. A vertical brace extends downward from the adapter plate and is provided with a plurality of jaw assemblies, which are pivotally connected to horizontal members which extend from the brace. The welding ribbons pass through the ribbon guide, which is mounted to the adapter plate, and pass through the jaw assemblies. By rotating a plurality of cams, which are in contact with the jaw assemblies, the relative angle between the jaw assemblies and ribons may be adjusted from a deep V-shape to a flattened shape. The distance between the jaw assemblies and ribbons may be adjusted to accommodate different weld angles of the welding ribbons by rotating an off-center pivot pin which is part of a pivot rod which, in turn, passes through the jaw assemblies. The jaw assembly can be easily modified to accommondate welding ribbons or bands of various thickness and/or width.

BRIEF DESCRIPTION OF THE DRAWINGS

FIG. 7 is a view similar to FIG. 6 but showing the jaw assemblies adjusted towards one another.

FIG. 8 is a side elevational view of the apparatus with jaw assemblies angled towards one another.

FIG. 9 is a view taken along line 9—9 of FIG. 8.

DETAILED DESCRIPTION OF THE PREFERRED EMBODIMENT

Figure 1:
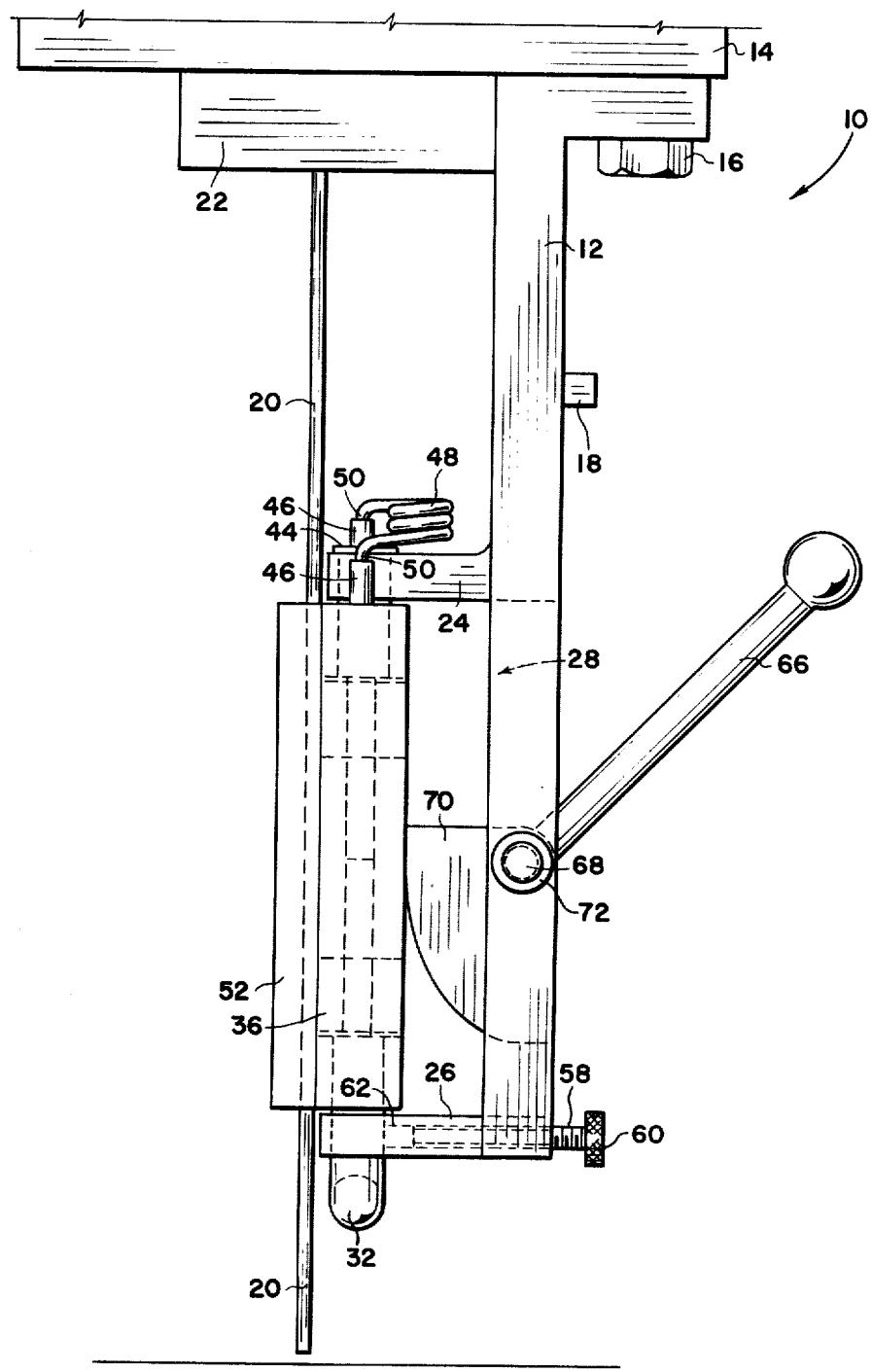
FIG. 1 is a side elevational view of a welding apparatus embodying the present invention.

Referring to the drawings in detail, reference character 10 generally indicates a welding apparatus for use with welding bands or ribbons where the angle between the bands and the distance therebetween may be adjusted. As shown in FIG. 1, the welding apparatus 10 is primarily comprised of a vertical brace 12 which is mounted to an adapter plate 14 by means of a plurality of threaded bolts 16. The adapter plate 14 allows the welding apparatus 10 to be connected to a standard submerged arc welding head, such as a Lincoln Model NA3S or model LAF3. The brace 12 is constructed of brass or copper so as to conduct the welding current which is supplied to the apparatus 10 by means of cables (not shown), which are connected to a lug 18, which extends outwardly from the upper rear portion of the brace 12. Welding bands or ribbons 20 are fed from rolls (not shown) through a band guide 22, which is mounted to the underside of the adapter plate 14. The welding bands 20 are preferable between one quarter to one and three quarters of an inch wide and 0.005 to 0.62 inches in thickness, but may be of other width or thickness.

Figure 3:
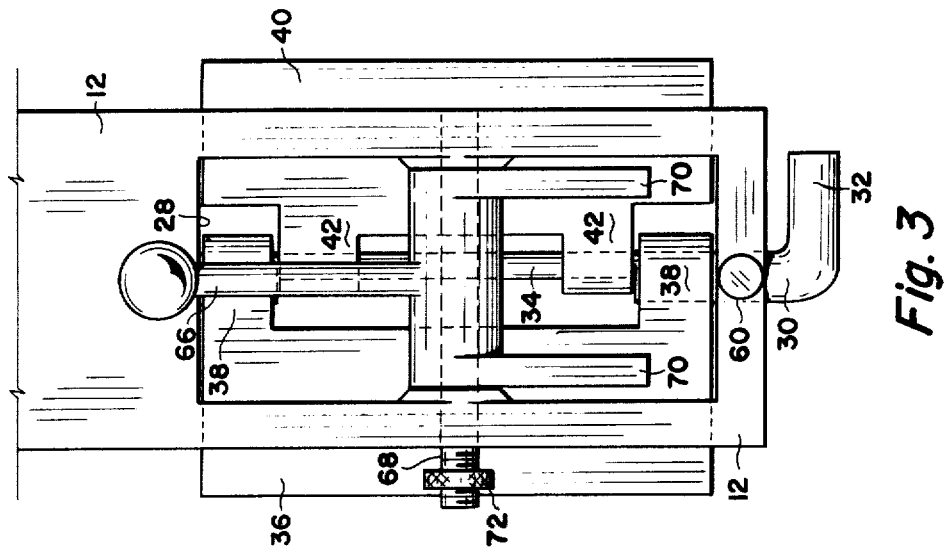
FIG. 3 is a partial rear elevational view of the apparatus.
Figure 2:
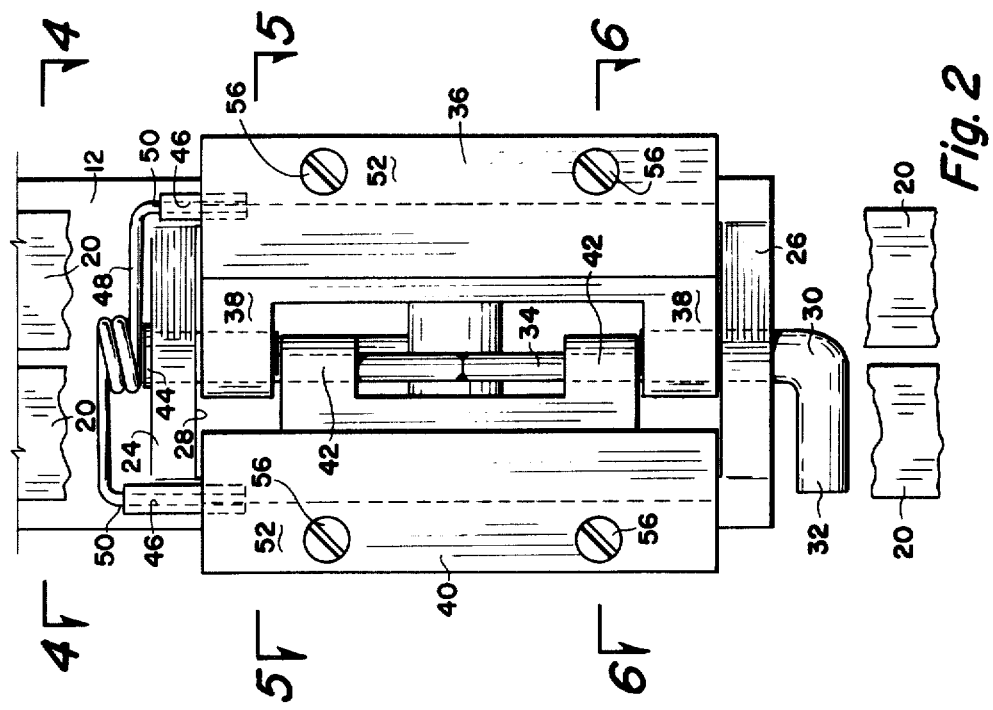
FIG. 2 is a partial front elevational view of the apparatus.
Figure 5:
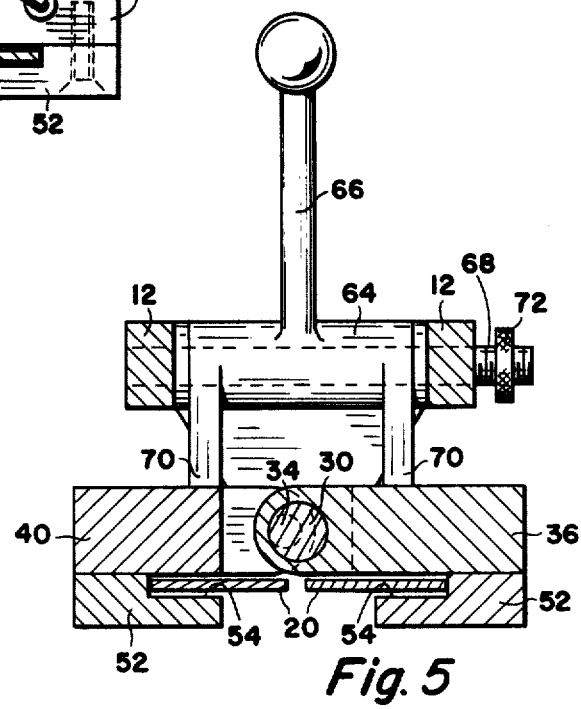
FIG. 5 is a view taken along line 5—5 of FIG. 2.
Figure 6:
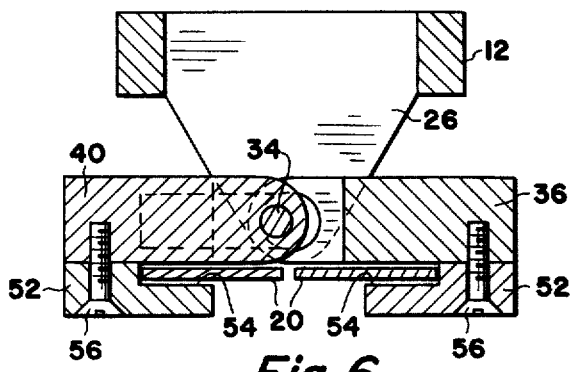
FIG. 6 is a view taken along line 6—6 of FIG. 2.

An upper horizontal triangular member 24 and a lower horizontal triangular member 26 extend forwardly from the brace 12. As shown in FIGS. 2 and 3, a rectangular opening 28 is spaced in the brace 12 between the upper member 24 and the lower member 26. A pivot rod 30 extends downwardly through the upper member 24 and through the lower member 26. The lower portion of the rod 30 is bent perpendicularly to form a handle 32. A central portion of the rod 30 is machined to a smaller diameter and is spaced off-center therefrom to form a pivot pin 34 (as shown in FIGS. 5 and 6). A right side jaw assembly 36 is spaced outward of the brace 12 and is provided with upper and lower parallel lugs 38 with the rod passing therethrough. A left side jaw assembly 40 is provided with upper and lower lugs 42, and is cooperable with the right side jaw assembly 36. The pivot pin 34 passes through the lugs 42. The top portion of the rod 30 is provided with a flattened cap 44 to secure the rod 30 between the members 24 and 26. A vertical tube 46 is spaced in the top portion of the right side jaw assembly 36 and the left side jaw assembly 40. A spring 48, with vertical leg portions 50, which are inserted in the tubes 46, biases the right and left jaw assemblies 36 and 40 in the open or flattened position.

Figure 4:
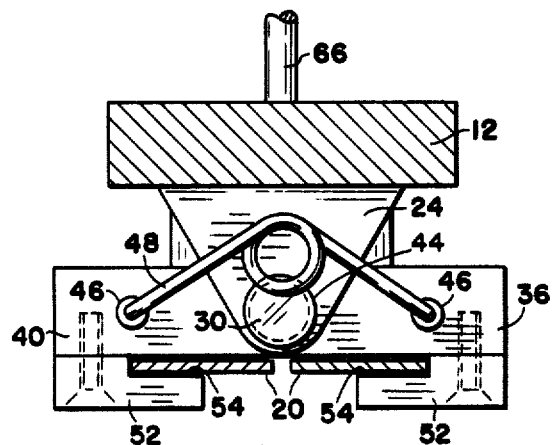
FIG. 4 is a view taken along line 4—4 of FIG. 2.

A bar 52, with a notch 54 provided therein, is mounted to the front portion of the right side and left side jaw assemblies 36 and 40 by means of a plurality of threaded screws 56. The welding bands 20 are inserted through the guide 22 and through the notches 54, as shown in FIGS. 4 and 6. The width of the notches 54 is critical in that the bands 20 must be easily slidable within the notches 54 but with close enough tolerance to eliminate electrical arcing between the bands 20 and the jaw assemblies 36 and 40. Generally, a width of 0.001 to 0.015 inches greater than the thickness of the band 20 is preferable. The bars 52 are removable in the event of wear or damage. Different width and length notches 54 may be used within the bars 52 to enable the apparatus 10 to use different thickness and width bands 20.

When the handle 32 is rotated the off-center pivot pin 34 causes the left side jaw assembly 40 to be moved towards or away from the right side jaw assembly 36 so as to adjust the distance between the edges of the bands 20. In some instances the band edges will touch. The distance between the bands 20 is maintained by a threaded screw 58, with a knurled knob 60 on the end thereof, which passes horizontally through the lower triangular member 26 and abuts against a brass plug 62, as shown by dotted lines in FIG. 1, which, in turn, is forced against the rod 30 and prevents the movement thereof.

A cylinder 64, with an elongated handle 66 extending outwardly therefrom, is spaced within the opening 28 in the brace 12 and is pivotally maintained therebetween by means of a bolt 68. Two parallel cams 70 extend from the cylinder 64 and are in contact with the back side of the jaw assemblies 36 and 40. As the handle 66 is lowered from the position shown in FIG. 1, wherein the cams 70 allow the jaw assemblies 36 and 40 to be in a flattened position, to a position as shown in FIG. 8, the cams 70 force the jaw assemblies 36 and 40 to be pivoted forwardly thereby positioning the welding bands 20 into a "V" position, as shown in FIG. 9. As can be seen, the angle between the bands 20 within the jaw assemblies 36 and 40 may be varied. The angle between the bands 20 may be maintained by means of a knurled nut 72 which is threaded onto the end of the bolt 68, which, when threaded against the brace 12, maintains the cylinder 64 in the desired position.

Figure 10:
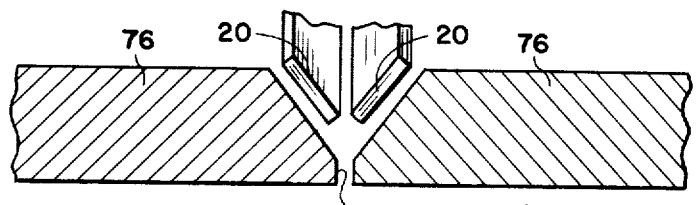
FIG. 10 is a side elevational view of a butt joint with the welding ribbons shaped into a deep V-shape within the joint.
Figure 11:
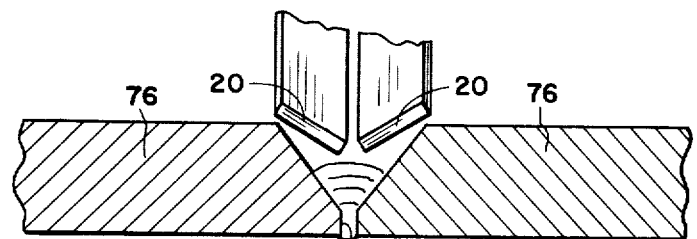
FIG. 11 is a view similar to FIG. 10 but showing the butt joint partially filled with material and with the ribbons partially opened.
Figure 12:
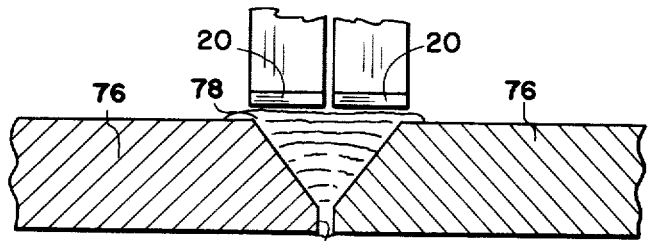
FIG. 12 is a view similar to FIG. 11 but with the ribbons in an open position to lay a cap weld over the filled butt joint.

Band-type welding apparatuses are generally used to coat or clad surfaces with welding material. As shown in FIG. 10, a joint 74 between two pipes 76 is usually V-shaped and, in order to deposit welding material into the joint 74, the handle 66 is rotated downward to a position whereby the angle between the bands 20 is the same as the angle between the sides of the V-shaped joint 74. As each successive layer of material is deposited within the joint 74, as shown in FIGS. 11 and 12, the angle between the bands 20 is decreased, by means of raising the handle 66, until the joint 74 is fully filled, the angle between the bands 20 is placed in the 180° or flattened position so as to form a cap weld 78.

Figure 13:
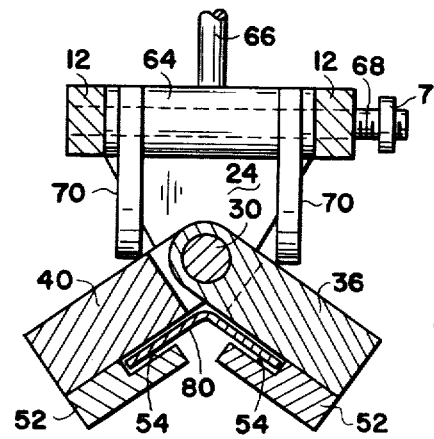
FIG. 13 is a view similar to FIG. 9 but showing a single welding ribbon.

Although two separate bands 20 have been shown and described, it is to be understood that the apparatus 10 may utilize a single band 80 of a width substantially equivalent to the two bands 20. This is shown in the partial view of FIG. 13.

Whereas the present invention has been described in particular relation to the drawings attached hereto, it should be understood that other and further modifications of the invention, apart from those shown or suggested herein, may be made within the scope and spirit of this invention.

What is claimed is:

1. An apparatus in combination with a welding head and a supply of a plurality of welding ribbons being comprised of:
    a vertical brace secured to said welding head and provided with a plurality of spaced horizontal members extending outwardly therefrom and an opening spaced between said members;
    a plurality of jaw assemblies being pivotally connected between said horizontal members with one of said ribbons passing through each of said jaw assemblies;
    means within said jaw assemblies to adjust the distance between said ribbons; and
    means attached to said brace and in communication with said jaw assemblies to adjust the relative angle between said ribbons.

2. An apparatus in combination with a submerged arc welding head and a supply of a plurality of welding ribbons being comprised of:
    an adapter plate being attached to said submerged arc welding head;
    a vertical brace attached to said adapter plate and being provided with a plurality of horizontal members extending outwardly therefrom and an opening spaced between said members;
    a ribbon guide being attached to said adapter plate with said ribbons passing therethrough;
    a plurality of jaw assemblies being pivotally connected between said horizontal members with one of said ribbons passing through each of said jaw assemblies;
    a spring means anchored to said jaw assemblies for biasing said jaw assemblies in a normally open position;
    means within said jaw assemblies to adjust the distance between said ribbons; and
    means attached to said brace and in communication with said jaw assemblies to adjust the relative angle between said ribbons.

3. An apparatus as set forth in claim 1 or 2 wherein said means to adjust the distance between said ribbons being comprised of:
    a pivot rod passing through said jaw assemblies with one of said jaw assemblies attached thereto;
    a central portion of said pivot rod being of smaller diameter and spaced off-center to said pivot rod with a second of said jaw assemblies attached thereto; and
    a handle connected to said pivot rod whereby when said handle is rotated the distance between said jaw assemblies and said ribbons passing therethrough is adjusted.

4. An apparatus as set forth in claim 3 wherein locking means provided to secure said pivot rod thereby maintaining the desired distance between said ribbons.

5. An apparatus as set forth in claim 1 or 2 wherein said means to adjust the relative angle between said ribbons being comprised of:
    a cylinder pivotally connected to said brace within said opening;
    a plurality of cams attached to said cylinder and acting upon said jaw assemblies; and a handle attached to said cylinder whereby when said handle is rotated said cams adjust the relative angle between said jaw assemblies and said ribbons passing therethrough.

6. An apparatus as set forth in claim 5 wherein locking means being provided to secure said cylinder thereby maintaining the desired relative angle between said ribbons.

7. An apparatus as set forth in claim 1 or 2 wherein said jaw assemblies being provided with removable ribbon guide plates.

* * * * *